United States Patent [19]

Raab et al.

[11] Patent Number: 5,205,389
[45] Date of Patent: Apr. 27, 1993

[54] CLUTCH DISK

[75] Inventors: Harald Raab, Schweinfurt; Norbert Ament, Werneck, both of Fed. Rep. of Germany

[73] Assignee: Fichtel & Sachs AG, Schweinfurt, Fed. Rep. of Germany

[21] Appl. No.: 768,815

[22] Filed: Sep. 30, 1991

[30] Foreign Application Priority Data

Oct. 6, 1990 [DE] Fed. Rep. of Germany ....... 4031762

[51] Int. Cl.⁵ .......................... F16D 13/64; F16D 3/14
[52] U.S. Cl. ..................................... 192/106.2; 464/68
[58] Field of Search ......................... 192/106.2; 464/68

[56] References Cited

U.S. PATENT DOCUMENTS

| | | | |
|---|---|---|---|
| 3,578,121 | 5/1971 | Maurice | 192/106.2 |
| 4,569,430 | 2/1986 | Raab et al. | 464/68 X |
| 4,586,595 | 5/1986 | Hartig et al. | 192/106.2 |
| 4,596,324 | 6/1986 | Braun | 192/106.2 |
| 4,603,767 | 8/1986 | Blond | 192/106.2 |
| 4,606,451 | 8/1986 | Martinez-Corral et al. | 192/106.2 |
| 4,650,053 | 3/1987 | Kayanoki et al. | 464/68 X |
| 4,684,007 | 8/1987 | Maucher | 192/106.2 |
| 4,726,454 | 2/1988 | Aiki | 192/106.2 |
| 4,860,871 | 8/1989 | Graton et al. | 192/106.2 X |
| 4,966,269 | 10/1990 | Raab et al. | 192/106.2 X |
| 4,998,608 | 3/1991 | Raab et al. | 192/106.2 |

FOREIGN PATENT DOCUMENTS

| | | |
|---|---|---|
| 3442717 | 5/1986 | Fed. Rep. of Germany . |
| 2107430 | 4/1983 | United Kingdom . |
| 2149476 | 6/1985 | United Kingdom . |
| 2167526 | 5/1986 | United Kingdom . |
| 8804373 | 6/1988 | World Int. Prop. O. . |

*Primary Examiner*—Rodney H. Bonck
*Attorney, Agent, or Firm*—Anderson Kill Olick & Oshinsky

[57] ABSTRACT

The invention relates to a clutch disk for a friction clutch in which a load and an idling system are provided. The idling system is bridged over by teeth (2a, 4) in the load system. A load friction disk (23) which simultaneously makes direct contact with one (11) of the two covering plates as well as the associated hub disk (12) is provided for producing a two-staged frictional force in the idling system. Owing to different material constitutions of the load friction disk (23) on opposing sides or owing to different material of the load friction disk (23) and the hub disk (12) it is possible to produce a jump in the frictional force. The load friction disk (23) is controlled primarily by stop edges, and additional control can be provided by a spring for the idling range, which is used after a predetermined angle of rotation.

6 Claims, 4 Drawing Sheets

CLUTCH DISK

BACKGROUND OF THE INVENTION

The invention relates to a clutch disk for a friction clutch, in particular of a motor vehicle.

A clutch disk for a motor vehicle friction clutch is known from DE-A-34 42 717, in which a load damper designed for load running as well as an idling damper designed for idle running is arranged on a hub which is concentric to an axis of rotation. The load damper comprises two lateral disks which are rigidly connected to one another and form the input part of the load damper as well as a hub disk as output part which is coupled non-rotatably but with predetermined rotational clearance to the hub via external teeth of the hub. The hub disk is torsionally elastically coupled to the lateral disks which are rotatable relative to the hub via springs designed for load running. The idling damper is arranged axially between one of the lateral disks and the hub disk of the load damper and, in turn, comprises a hub disk resting non-rotatably on the hub as well as, axially on both sides of the hub disk, two lateral disks which are coupled to one another and to the load hub disk and are torsionally elastically coupled to the idling hub disk by springs. Separate friction devices designed for the respective operating range are allocated to both the load damper and the idling damper. The load friction device comprises a friction disk which co-operates with the springs of the idling damper and is arranged axially between the idling hub disk and the lateral disk, consisting of plastics material and resting on the load hub disk, of the idling damper. Between the idling hub disk and the other lateral disk of the idling damper there is arranged a friction disk on which the load friction disk is non-rotatably axially supported via axially bent lugs. A first spring for producing the frictional force is provided axially between the idling damper and the lateral disk of the load damper adjacent thereto, and a second spring is arranged axially between the load friction disk and the plastics lateral disk of the idling damper. The idling damper comprises a plurality of springs which are arranged in apertures of different sizes so that they act in succession.

SUMMARY OF THE INVENTION

The invention provides a clutch disk for a friction clutch which manages with comparatively few components and requires comparatively little space in the axial direction, despite friction devices, both for idle running and for load running.

The invention is based on a clutch disk for a friction clutch comprising the following features: a hub which is concentric to an axis of rotation, a load damper, designed for load running, with an input part which is rotatable relative to the hub and an output part which is torsionally elastically coupled to the input part by means of a plurality of first springs designed for load running and is coupled with a first limited rotational clearance but otherwise non-rotatably to the hub, an idling damper which acts only within the first rotational clearance and is designed for idle running, with an input disk part coupled to the output part and an output disk part which is held non-rotatably on the hub and is coupled torsionally elastically to the input disk part by means of at least one second spring designed for idle running, a load friction device, designed for load running, with a friction disk arranged axially between the two disk parts of the idling damper and a friction device designed for idle running.

With such a clutch disk it is proposed according to the invention that the friction disk is axially resiliently in direct frictional contact both with the input disk part and the output disk part of the idling damper and that the coefficient of friction of the friction pairs between the friction disk and the input disk part on the one hand and the friction disk and the output disk part on the other hand are different.

Owing to the different coefficient of friction or friction correction values, the direct contact and the direct frictional touching of the friction disk of the load friction device and the two disk parts of the idling damper allows particularly space-saving constructions which can be used very widely and can easily be adapted to different motor vehicles without high expenditure.

In a preferred embodiment of the invention, the friction disk is coupled with a second limited rotational clearance but otherwise non-rotatably to a first one of the two disk parts of the idling damper, and the coefficient of friction of the friction pair between the first disk part and the friction disk is lower than the coefficient of friction of the friction pair between the second one of the two disk parts and the friction disk. For this purpose, the friction disk can be provided with noses which are angled axially and engage with clearance in the peripheral direction in recesses, in particular in the output disk part. This ensures that the friction disk of the load friction device is initially entrained by the second disk part at the beginning of the relative rotational movement as the high coefficient of friction acts here and the lower friction between the friction disk and the first disk part is initially overcome until the friction disk, with its noses, comes into contact with the end limits of the recesses and from there on the higher friction acts. Two different frictional forces can be used in succession within the operating angle of rotation of the idling damper in this simple manner.

Similarly to the clutch disk in DE-A-34 42 717, the load damper comprises two lateral disks which are rigidly connected to one another, are arranged axially on both sides of a hub disk and are torsionally elastically coupled to the hub disk via the first springs. The load hub disk is coupled to the hub non-rotatably but with a rotational clearance which determines the range of the operating angle of the idling damper via teeth, and the idling damper is in turn arranged axially between the load hub disk and one of the load lateral disks. The external teeth of the hub form two shoulders which point axially away from one another and of which a first shoulder forms a stop for the idling hub disk. A first axially acting spring is fixed axially between the load hub disk and the load lateral disk located at a distance from the idling damper. A second axially acting spring is provided between this load lateral disk and the second shoulder of the external teeth. In this way, the two axially acting springs which produce the frictional forces of the idling damper on the one hand and of the load damper on the other hand can be radially superimposed in a space-saving construction.

The friction disk of the load friction device and the two disk parts of the idling damper can all consist of metal in a first variation, one of these parts, preferably the friction disk, being coated on the side intended for the lower coefficient of friction with a material which reduces the coefficient of friction. The coating can be designed, for example, as a plastics coating which has been sprayed or applied, for example, in the form of a sliding paint.

However, as proposed in a second variation, it is also possible to construct one of the disk parts of the idling damper, in particular the output disk part, as a plastics moulding, while the other disk part and the friction disk consist of metal.

In a particularly simple embodiment, the friction disk of the load friction device can be controlled exclusively via noses of the friction disk which engage in associated recesses in the output disk part of the idling damper. During a reversal of the direction of rotation, the lower frictional force will always act first in this way and the higher frictional force will only act subsequently after the rotational clearance defined by the noses and the recesses has been used up. However, it is also possible, in addition to the control by noses and recesses, to use at least one of the springs of the idling damper for the formation of a second spring stage in idle running, and this ensures that the complete frictional force is initially present even during a reversal of the direction of rotation in idle running and the lower stage is used only after a certain angle of rotation.

It will be appreciated that the input disk part of the idling damper can comprise a single lateral disk which is arranged on the side of the output disk part remote from the load hub disk. In a variation, however, lateral disks which are non-rotatably connected to one another and can be coupled, preferably without rotational clearance, to the load hub disk can also be provided axially on both sides of the output disk part of the idling damper.

The various features of novelty which characterise the invention are pointed out with particularity in the claims annexed to, and forming part of, this disclosure. For a better understanding of the invention, its operating advantages and specific objects attained by its use, reference should be had to the accompanying drawings and descriptive matter in which there are illustrated and described preferred embodiments of the invention.

DESCRIPTION OF PREFERRED EMBODIMENTS

Figure 1:
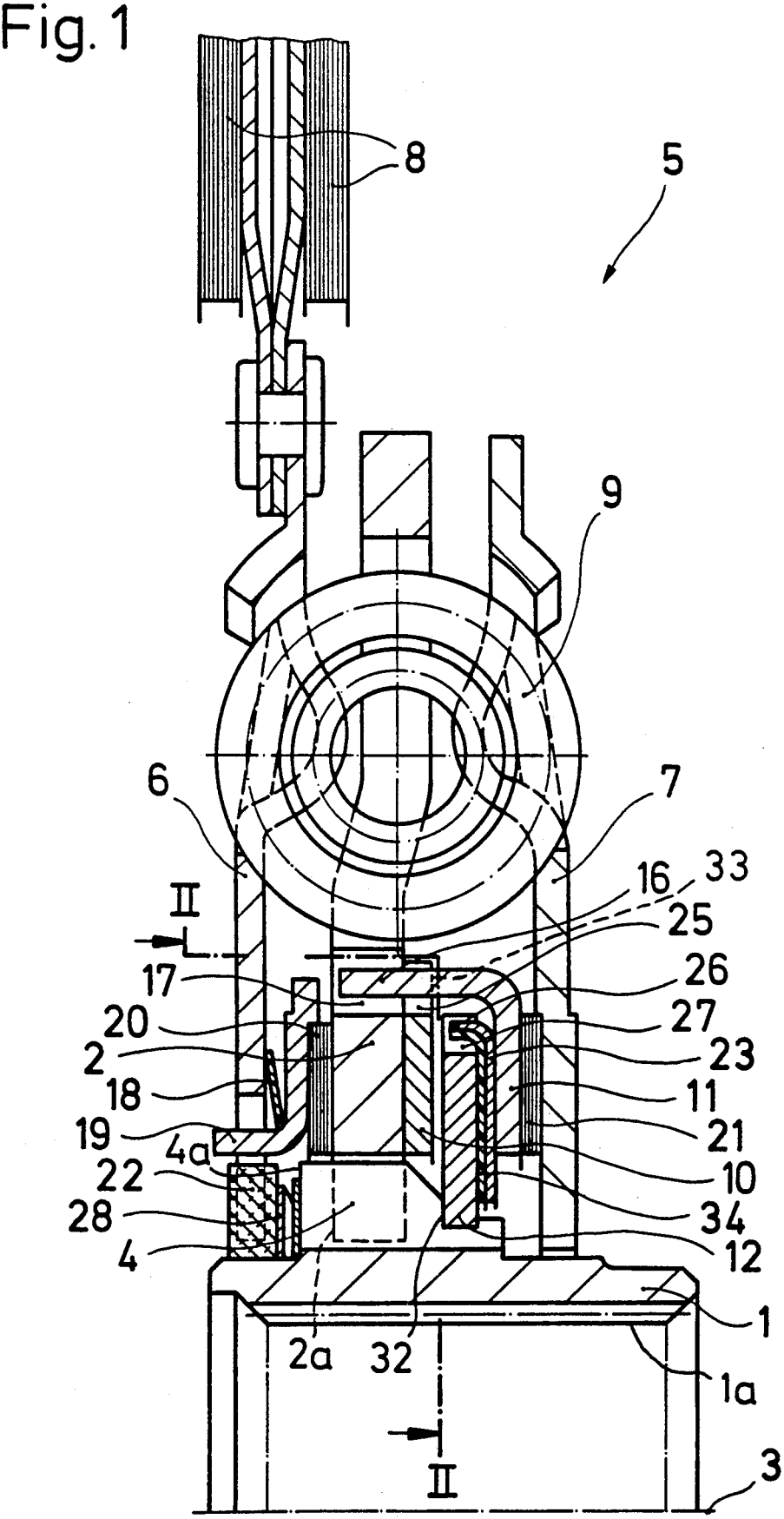
FIG. 1 is an axial longitudinal section through one half of a clutch disk for a motor vehicle friction clutch
Figure 2:
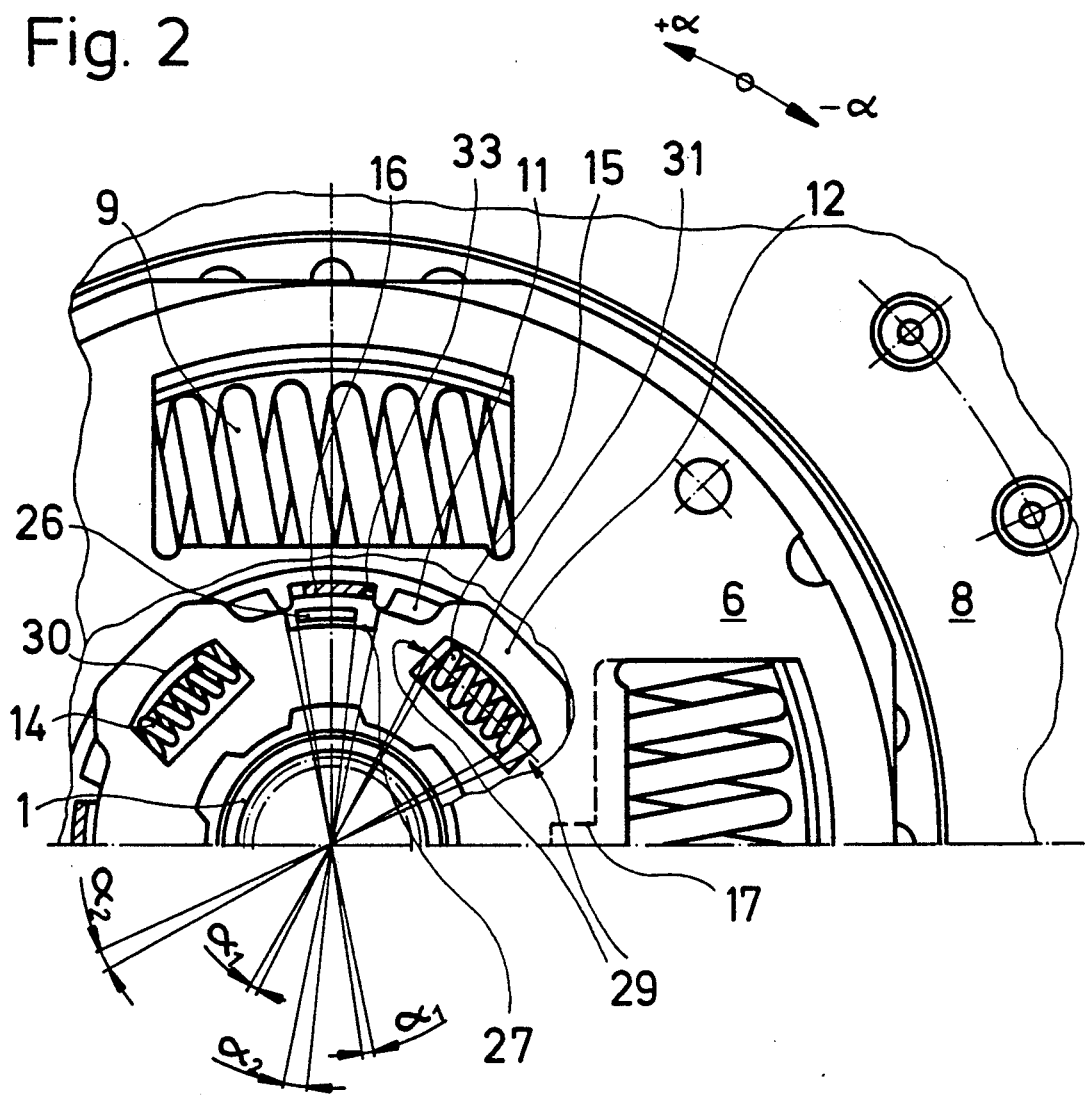
FIG. 2 is a partial axial cross section through the clutch disk, viewed along a line II—II in FIG. 1.
Figure 5:
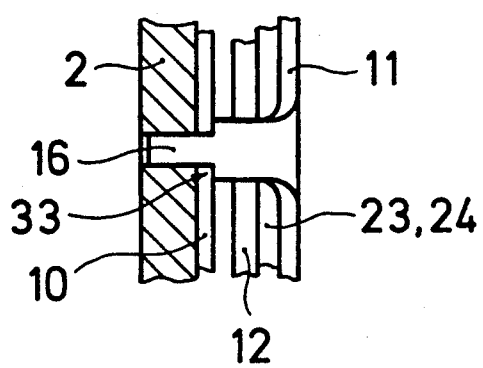
FIG. 5 is a partial view of the clutch disk as viewed along a line V—V in FIG. 4.

FIGS. 1 and 2 show the partial longitudinal section as well as the section II—II through a clutch disk 5 of which the components are constructed concentrically to an axis of rotation 3. A hub 1 with internal teeth 1a is non-rotatably placed onto a gearshaft (not shown). On the external periphery, the hub 1 has teeth 4 into which a hub disk 2 with internal teeth 2a engages with clearance in the peripheral direction according to the range of action of an idling damper. Lateral disks or covering plates 6 and 7 which are non-rotatably connected to one another and are spaced apart and of which one carries clutch friction linings 8 are arranged axially on both sides of the hub disk 2. A hub disk 12 which is part of the idling damper system is also laterally offset relative to the hub disk 2 on the hub 1. The hub disk 12 is non-rotatably placed on a portion of the teeth 4 which is reduced to form an offset 32 in diameter. Axial fastening of the hub disk 12 is basically necessary only in one direction, more specifically in the direction toward the hub disk 2 (for example by the offset 32 of the teeth 4). On both sides of the hub disk 12 there are arranged lateral disks or covering plates 10 and 11 of which the covering plate 10 lies directly on the hub disk 2, and the two covering plates are non-rotatably connected to the hub disk 2 in that axially projecting noses 16 of the external covering plate 11 penetrate corresponding recesses 25 in the internal covering plate 10 as well as openings 17 in the hub disk 2 without clearance in the peripheral direction. At the same time—as also shown in FIG. 5—each of the noses 16 rests axially on the internal covering plate 10 from the exterior via supporting edges 33. Between the external covering plate 11 and the hub disk 12 of the idling damper, moreover, there is arranged a load friction disk 23 which completely fills the axial space between covering plate and hub disk and thus makes direct frictional contact with the two parts. The supporting edges 33 of the covering plate 11 prevent frictional contact between the hub disk 12 and the internal covering plate 10. A friction ring 21 for the load range is provided on the exterior of the covering plate 11 and opposite the radially internal region of the covering plate 7, and a spring 18 which exerts an axial force on a friction ring 20 and the hub disk 2 via a thrust collar 19 is provided on the side of the hub disk 2 remote from the idling system. The thrust collar 19 is non-rotatably—but axially movably—guided relative to the covering plate 6. A bearing 22 which is guided on a cylindrical offset of the hub 1 and is rigidly connected to the covering plate 6 is arranged radially inside the spring 18 or the thrust collar 19. Between this bearing 22 and the end face of the teeth 4 of the hub 1 there is arranged a further spring 28 which serves to produce the frictional force for the idling damper. FIG. 1 also shows the basic arrangement of damper springs 9 for the load range in apertures of the hub disk 2 and the covering plates 6 and 7. The arrangement of springs 14 and 15 for the idling system is shown in FIG. 2. The section II—II according to FIG. 1 is arranged in the plane of the supporting edges 33. In addition to the noses 16 of the covering plate 11, it shows the arrangement of the two springs 14 and 15, the spring 14 being arranged without clearance in the peripheral direction both in apertures 30 in the hub disk 12 and in equally large apertures in the covering plates 10 and 11. On the other hand, the spring 15 is arranged peripherally without clearance in the two covering plates 10, 11 while the corresponding aperture 31 in the hub disk 12 is however peripherally greater in design. A kinked spring characteristic can therefore be produced within the range of action of the idling damper in that the spring 15 acts, after covering a predetermined angle of rotation, in addition to the spring 14. Of the two types of spring, there are usually two diametrically facing one another in each case. This Figure also shows that the load friction disk 23 has axially angled noses 26 which engage with clearance in the peripheral direction in corresponding recesses 27 in the hub disk 12. At the same time, the load friction disk 23 in the present case has an aperture for receiving the spring 15 the aperture having peripheral stop edges 29 which correspond to the corresponding apertures in the covering plates 10 and 11. According to FIG. 2, apertures, noses and recesses are arranged such that—starting from the rest position illustrated—with a fixed hub 1 in the pulling direction, i.e. in the direction of a negative angle $\alpha$, an angle of rotation $\alpha 2$ is provided in which the load friction disk can move until the noses 26 strike the recess and the springs 15 come to rest in the aperture of the hub disk 12. In the pushing direction, i.e. against the pulling direction, the same situation arises over an angle of $\alpha 1$ for positive angle $\alpha$.

As shown in FIG. 1, the load friction disk 23 is provided with a coating 34 consisting of a material to promote sliding, while its base body is produced from metal. At the same time, the hub disk 12 like the covering plate 11 is also produced from metal in this embodiment.

Figure 3:
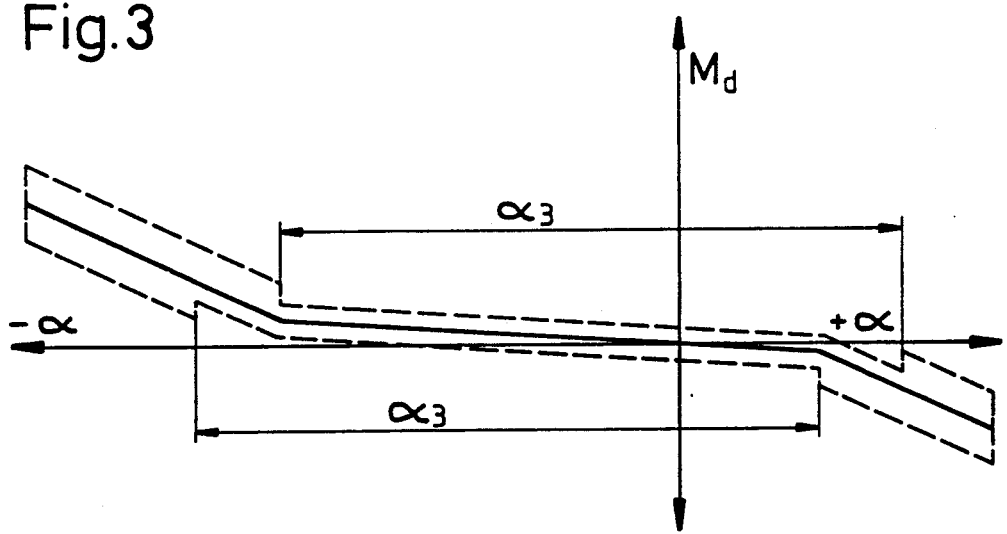
FIG. 3 is a torque characteristic of an idling damper of the clutch disk which shows the clutch torque $M_d$ as a function of the relative angle of rotation $\alpha$.

With reference to FIG. 3, the operation of the clutch disk 5 will be described in more detail hereinafter. FIG. 3 shows the torque trend and the frictional force trend within the range of action of the idling system, the torque being plotted over the angle of rotation $\alpha$. Starting from the rest position according to FIG. 2, the load damper, when loaded in the pulling direction, i.e. with a positive angle $\alpha$, should be considered as a rotation-resistant component in which the two covering plates 6 and 7 can be rotated in the pulling direction relative to the hub 1 as a unit together with the hub disk 2 via the springs 9. The hub disk 12 of the idling system is held by the hub 1 and the two covering plates 10 and 11 are rotated by the hub disk 2. This is initially effected via a flat region of the spring characteristic by loading the springs 14, the low friction between the coating 34 of the load friction disk 23 and the hub disk 12 being effective, as the load friction disk 23 is entrained by the higher frictional force between its metal base body and the covering plate 11 and via the stop edges 29 of the spring 15. It should be noted that in the idling system, the initial tension of the spring 18 is no longer noticeable as a free space is produced via the supporting edges 33 of the covering plate 11. The pressing force for the friction loading of the load friction disk 23 originates from the force of a spring 28 which is supported axially on a shoulder 4a of the teeth 4 and, via the covering plate 6, the covering plate 7, the friction ring 21 and the covering plate 11 exerts an axial force on the hub disk 12 with interposition of the load friction disk 23. In the first range of the angle of rotation corresponding to 2 there is therefore produced a low friction which, on the one hand, acts between the coating 34 of the load friction disk 23 and the hub disk 12 and, on the other hand, results from a relative movement between the spring 28 and the bearing 22 or the contact face on the teeth 4. This low friction is shown in a broken line in FIG. 3. After the angle $\alpha 2$ has been covered, on the one hand the nose 26 comes to rest on the corresponding edge of the recess 27 of the hub disk and at the same time the spring 15 comes to rest on the corresponding edge of the aperture 31 also in the hub disk 12. Therefore the inclination of the torque trend changes on the one hand, forming a kink in the torque characteristic. On the other hand, the friction increases suddenly to a greater value corresponding to the broken characteristic line, as the higher friction of metal on metal is now effective between the load friction disk 23 and the covering plate 11. During a reversal of the direction of rotation within the steeper spring characteristic of the idling system or during the return from the pulling range (negative angle $\alpha$) into the operating range of the idling system, the high frictional force is also built up immediately as the spring 15, during its release phase, keeps the corresponding stop edge 29 fixed in the load friction disk 23 with one end until the remaining initial spring tension of the spring 15 falls below the value of the frictional force between load friction disk 23 and covering plate 11. A jump in the frictional force from the high to the low value exists at this point and only the lower frictional value acts thereafter. Exactly the same operation takes place when the clutch disk is loaded in the pushing direction (positive angle $\alpha$). In the present case, it can be seen from FIGS. 2 and 3 that distribution takes place asymmetrically from the central position outward. This is merely a dimensioning matter and completely symmetrical path distribution can also take place. A free angle of rotation 3 round the neutral central position which is composed of the two angles $\alpha 1$ and $\alpha 2$ and in which only the lower frictional force is effective is provided in each case. These two angles 3 are shifted relative to one another as, during a reversal of the direction of rotation from greater angles of rotation to smaller angles of rotation, the spring 15 is occupied with low residual initial tension which corresponds to the value of the higher frictional force between load friction disk 23 and covering plate 11.

Figure 6:
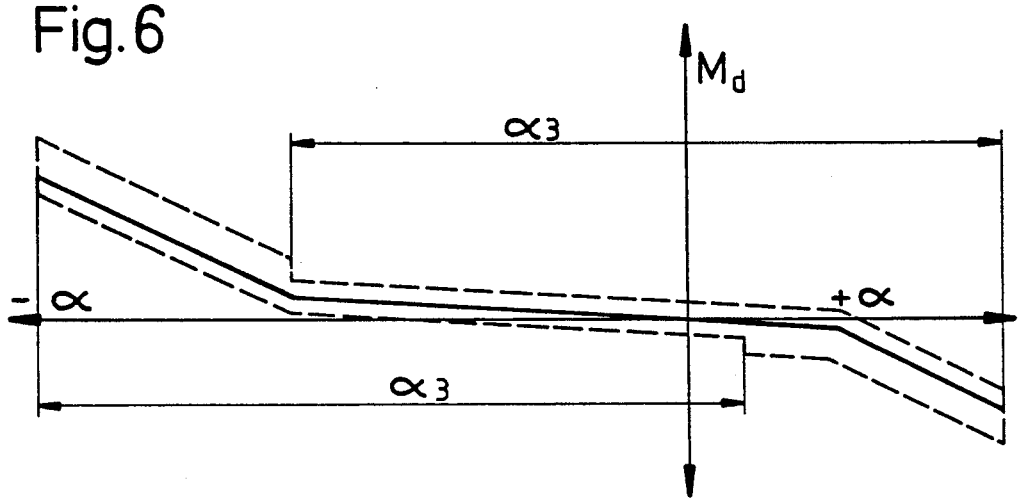
FIG. 6 is a torque characteristic of the idling damper of the clutch disk from FIG. 4 which shows the clutch torque $M_d$ as a function of the relative angle of rotation $\alpha$.
Figure 4:
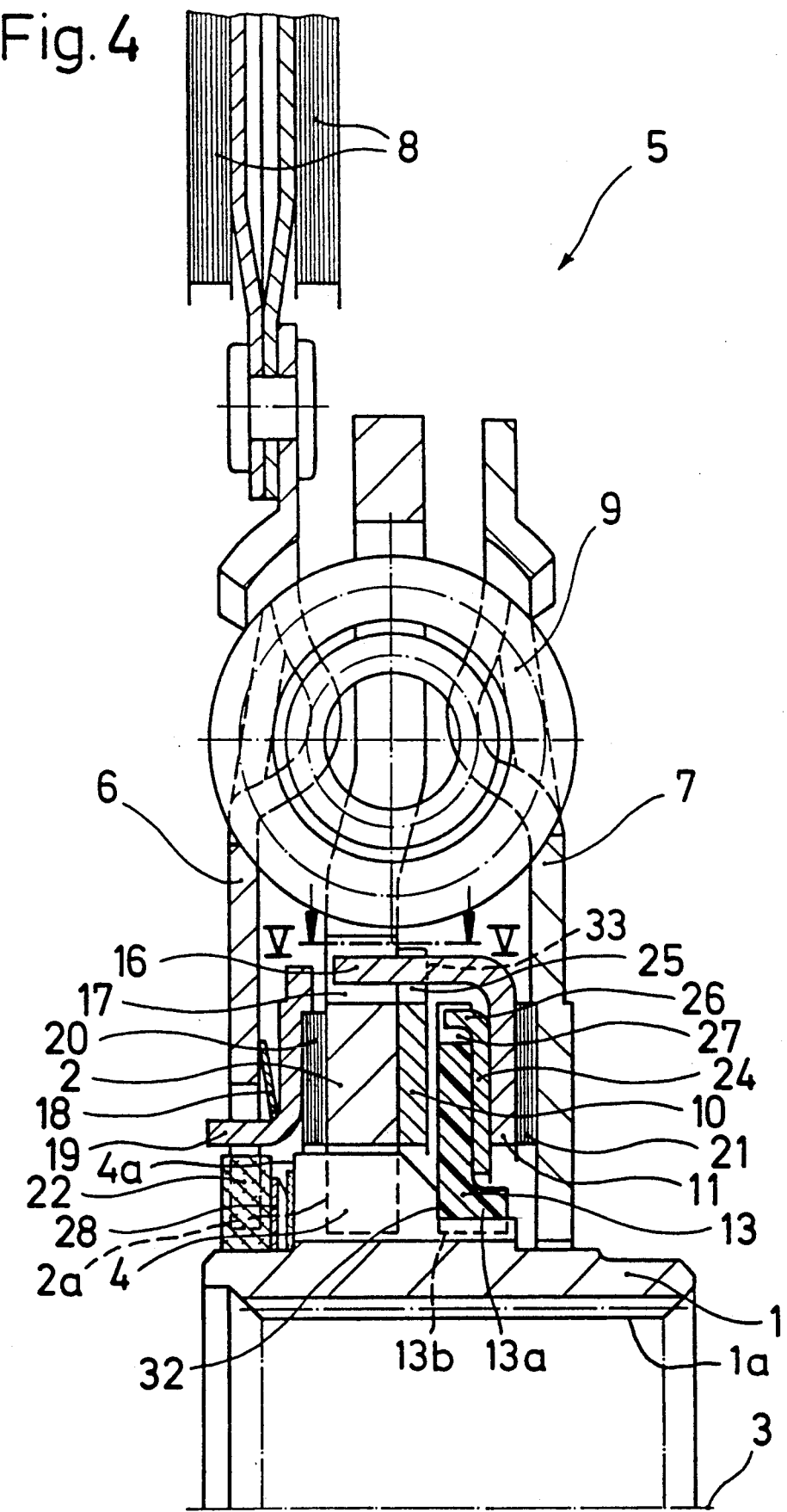
FIG. 4 is an axial longitudinal section through the upper half of a variation of the clutch disk.

A variation of the construction described hitherto is shown in FIGS. 4 and 5. According to FIG. 4, a load friction disk 24 of the idling system is produced completely from metal while the hub disk 13 of the idling damper is designed as a plastics part. In this way, slighter friction can also be produced between the load friction disk 24 and the hub disk 13 than between the load friction disk 24 and the covering plate 11. The hub disk 13 is substantially L-shaped in design and is non-rotatably placed with a hub projection 13a via internal teeth 13b onto the reduced diameter teeth 4 of the hub 1. The hub disk 13 is simultaneously axially placed on the offset 32 of the teeth 4—to transmit the supporting force of the spring 28. As a further distinction, it is proposed in the construction according to FIG. 4 that the load friction disk 24 is controlled solely by the noses 26 and the recesses 27. The difference in the development of the frictional force is shown in FIG. 6, more specifically the low friction is produced firstly over the angular range $\alpha 3$ during each reversal of the direction of rotation, and the use of the higher friction only begins thereafter. This is due to the fact that the load friction disk 24 is entrained only by the higher friction relative to the covering plate 11 providing that the noses 26 find freedom of movement in the recesses 27. As described with reference to the previous construction, a jump in frictional force is also produced stepwise in this construction over the angle of rotation of the idling range. According to the construction shown in FIG. 4, the production costs are particularly low. The jump in the frictional force is dependent on the friction correction values or coefficients of friction which can be produced between the load friction disk and the covering plate on the one hand and the hub disk on the other hand.

The described construction has a very small overall axial width and, with few individual parts, can produce a staggered frictional force in the idling range in which great variations are possible with respect to adaptation.

While specific embodiments of the invention have been shown and described in detail to illustrate the application of the inventive principles, it will be understood that the invention may be embodied otherwise without departing from such principles.

What we claim is:

1. Clutch disk for a friction clutch comprising:
   a hub (1) which is concentric to an axis of rotation (3);
   a load damper, designed for load running, with an input part (6, 7) which is rotatable relative to the hub (1) and an outer part (2) which is torsionally elastically coupled to the input part (6, 7) by means of a plurality of first springs (9) designed for load running and is coupled with a first limited rotational clearance but otherwise non-rotatably to the hub (1);
   an idling damper, which acts only within the first rotational clearance and is designed for idle running, with an input disk part (10, 11) coupled to the output part (2) and an output disk part (12, 13) which is held non-rotatably on the hub (1) and is coupled torsionally elastically to the input disk part (11) by means of at least one second spring (14, 15) designed for idle running;
   a load friction device, designed for load running, with a rotatable friction disk (23, 24) arranged axially between the two disk parts (11, 12; 11, 13) of the idling damper;
   a friction device designed for idle running, wherein the friction disk (23, 24) is axially resiliently in direct frictional contact with the input disk part (11) on one of its sides and, with the output disk part (12; 13) of the idling damper on the other of its sides, and wherein a friction pair between the friction disk (23, 24) and the input disk part (11) has a coefficient of friction that is different from a coefficient of friction of a friction pair between the friction disk (23, 24) and the output disk part (12, 13); and
   the friction disk (23, 24) is coupled with a second limited rotational clearance but otherwise non-rotatably to a first one (12, 13) of the two disk parts and the coefficient of friction of the friction pair between the first disk part (12, 13) and the friction disk (23, 24) is lower than the coefficient of friction of the friction pair between the second one (11) of the two disk parts and the friction disk (23, 24).

2. Clutch disk for a friction clutch comprising:
   a hub (1) which is concentric to an axis of rotation (3);
   a load damper, designed for load running, with an input part (6, 7) which is rotatable relative to the hub (1) and an outer part (2) which is torsionally elastically coupled to the input part (6, 7) by means of a plurality of first springs (9) designed for load running and is coupled with a first limited rotational clearance but otherwise non-rotatably to the hub (1);
   an idling damper, which acts only within the first rotational clearance and is designed for idle running, with an input disk part (10, 11) coupled to the output part (2) and an output disk part (12, 13) which is held non-rotatably on the hub (1) and is coupled torsionally elastically to the input disk part (11) by means of at least one second spring (14, 15) designed for idle running;
   a load friction device, designed for load running, with a rotatable friction disk (23, 24) arranged axially between the two disk parts (11, 12; 11, 13) of the idling damper;
   a friction device designed for idle running, wherein the friction disk (23, 24) is axially resiliently in direct frictional contact with the input disk part (11) on one of its sides and, with the output disk part (12, 13) of the idling damper on the other of its sides, and wherein a friction pair between the friction disk (23, 24) and the input disk part (11) has a coefficient of friction that is different from a coefficient of friction of a friction pair between the friction disk (23, 24) and the output disk part (12, 13);
   the friction disk (23, 24) is coupled with a second limited rotational clearance but otherwise non-rotatably to a first one (12, 13) of the two disk parts and the coefficient of friction of the friction pair between the first disk part (12, 13) and the friction disk (23, 24) is lower than the coefficient of friction of the friction pair between the second one (11) of the two disk parts and the friction disk (23, 24); and
   the entire second limited rotational clearance is smaller than the entire first limited rotational clearance.

3. Clutch disk for a friction clutch comprising:
   a hub (1) which is concentric to an axis of rotation (3);
   a load damper, designed for load running, with an input part (6, 7) which is rotatable relative to the hub (1) and an outer part (2) which is torsionally elastically coupled to the input part (6, 7) by means of a plurality of first springs (9) designed for load running and is coupled with a first limited rotational clearance but otherwise non-rotatably to the hub (1);
   an idling damper, which acts only within the first rotational clearance and is designed for idle running, with an input disk part (10, 11) coupled to the output part (2) and an output disk part (12, 13) which is held non-rotatably on the hub (1) and is coupled torsionally elastically to the input disk part (11) by means of at least one second spring (14, 15) designed for idle running;
   a load friction device, designed for load running, with a rotatable friction disk (23, 24) arranged axially between the two disk parts (11, 12; 11, 13) of the idling damper;
   a friction device designed for idle running, wherein the friction disk (23, 24) is axially resiliently in direct frictional contact with the input disk part (11) on one of its sides and, with the output disk part (12, 13) of the idling damper on the other of its sides, and wherein a friction pair between the friction disk (23, 24) and the input disk part (11) has a coefficient of friction that is different from a coefficient of friction of a friction pair between the friction disk (23, 24) and the output disk part (12, 13);
   the friction disk (23, 24) is coupled with a second limited rotational clearance but otherwise non-rotatably to a first one (12, 13) of the two disk parts and the coefficient of friction of the friction pair between the first disk part (12, 13) and the friction disk (23, 24) is lower than the coefficient of friction of the friction pair between the second one (11) of the two disk parts and the friction disk (23, 24); and
   the friction disk (23) and the two disk parts (11, 12) consist of metal and, between the friction disk (23) and on the first one (12) of the two disk parts there is arranged a material layer (34) which has a lower coefficient of friction in the friction pairing with metal than the coefficient of friction of the friction pairing of metal on metal.

4. Clutch disk for a friction clutch comprising:
a hub (1) which is concentric to an axis of rotation (3);
a load damper, designed for load running, with an input part (6, 7) which is rotatable relative to the hub (1) and an outer part (2) which is torsionally elastically coupled to the input part (6, 7) by means of a plurality of first springs (9) designed for load running and is coupled with a first limited rotational clearance but otherwise non-rotatably to the hub (1);
an idling damper, which acts only within the first rotational clearance and is designed for idle running, with an input disk part (10, 11) coupled to the output part (2) and an output disk part (12, 13) which is held non-rotatably on the hub (1) and is coupled torsionally elastically to the input disk part (11) by means of at least one second spring (14, 15) designed for idle running;
a load friction device, designed for load running, with a rotatable friction disk (23, 24) arranged axially between the two disk parts (11, 12; 11, 13) of the idling damper;
a friction device designed for idle running, wherein the friction disk (23, 24) is axially resiliently in direct frictional contact with the input disk part (11) on one of its sides and, with the output disk part (12, 13) of the idling damper on the other of its sides, and wherein a friction pair between the friction disk (23, 24) and the input disk part (11) has a coefficient of friction that is different than a coefficient of friction of a friction pair between the friction disk (23, 24) and the output disk part (12, 13);
the friction disk (23, 24) is coupled with a second limited rotational clearance but otherwise non-rotatably to a first one (12, 13) of the two disk parts and the coefficient of friction of the friction pair between the first disk part (12, 13) and the friction disk (23, 24) is lower than the coefficient of friction of the friction pair between the second one (11) of the two disk parts and the friction disk (23, 24); and
the friction disk (23) and the two disk parts (11, 12) consist of metal and, between the friction disk (23) and on the first one (12) of the two disk parts there is arranged a plastics layer (34) which has a lower coefficient of friction in the friction pairing with metal than the coefficient of friction of the friction pairing of metal on metal.

5. Clutch disk for a friction clutch comprising:
a hub (1) which is concentric to an axis of rotation (3);
a load damper, designed for load running, with an input part (6, 7) which is rotatable relative to the hub (1) and an outer part (2) which is torsionally elastically coupled to the input part (6, 7) by means of a plurality of first springs (9) designed for load running and is coupled with a first limited rotational clearance but otherwise non-rotatably to the hub (1);
an idling damper, which acts only within the first rotational clearance and is designed for idle running, with an input disk part (10, 11) coupled to the output part (2) and an output disk part (12, 13) which is held non-rotatably on the hub (1) and is coupled torsionally elastically to the input disk part (11) by means of at least one second spring (14, 15) designed for idle running;
a load friction device, designed for load running, with a rotatable friction disk (23, 24) arranged axially between the two disk parts (11, 12; 11, 13) of the idling damper;
a friction device designed for idle running, wherein the friction disk (23, 24) is axially resiliently in direct frictional contact with the input disk part (11) on one of its sides and, with the output disk part (12, 13) of the idling damper on the other of its sides, and wherein a friction pair between the friction disk (23, 24) and the input disk part (11) has a coefficient of friction that is different than a coefficient of friction of a friction pair between the friction disk (23, 24) and the output disk part (12, 13);
the friction disk (23, 24) is coupled with a second limited rotational clearance but otherwise non-rotatably to a first one (12, 13) of the two disk parts and the coefficient of friction of the friction pair between the first disk part (12, 13) and the friction disk (23, 24) is lower than the coefficient of friction of the friction pair between the second one (11) of the two disk parts and the friction disk (23, 24); and
the output disk part (13) is constructed as a plastics moulding and the friction disk (24) as well as the input disk part (11) consist of metal.

6. Clutch disk for a friction clutch comprising:
a hub (1) which is concentric to an axis of rotation (3);
a load damper, designed for load running, with an input part (6, 7) which is rotatable relative to the hub (1) and an outer part (2) which is torsionally elastically coupled to the input part (6, 7) by means of a plurality of first springs (9) designed for load running and is coupled with a first limited rotational clearance but otherwise non-rotatably to the hub (1);
an idling damper, which acts only within the first rotational clearance and is designed for idle running, with an input disk part (10, 11) coupled to the output part (2) and an output disk part (12, 13) which is held non-rotatably on the hub (1) and is coupled torsionally elastically to the input disk part (11) by means of at least one second spring (14, 15) designed for idle running;
a load friction device, designed for load running, with a rotatable friction disk (23, 24) arranged axially between the two disk parts (11, 12; 11, 13) of the idling damper;
a friction device designed for idle running, wherein the friction disk (23, 24) is axially resiliently in direct frictional contact with the input disk part (11) on one of its sides and, with the output disk part (12, 13) of the idling damper on the other of its sides, and wherein a friction pair between the friction disk (23, 24) and the input disk part (11) has a coefficient of friction that is different from a coefficient of friction of a friction pair between the friction disk (23, 24) and the output disk part (12, 13);
the friction disk (23, 24) is coupled with a second limited rotational clearance but otherwise non-rotatably to a first one (12, 13) of the two disk parts and the coefficient of friction of the friction pair between the first disk part (12, 13) and the friction disk (23, 24) is lower than the coefficient of friction of the friction pair between the second one (11) of the two disk parts and the friction disk (23, 24); and the idling damper comprises at least two of the second springs (14, 15) which are held in apertures in the idling hub disk (12, 13) on the one hand and of each idling lateral disk (10, 11) on the other hand, wherein the apertures (29) provided in the idling hub disk (12, 13) of a first one (15) of the second springs is greater in a peripheral direction than that of a second one (14) of the two second springs so that the two second springs (14, 15) are used in succession and the first one (15) of the two second springs is also held without clearance in the peripheral direction in an aperture in the friction disk (23, 24).

* * * * *